United States Patent

[11] 3,621,194

[72] Inventor Clara M. Vermillion
 Huntingtown, Md.
[21] Appl. No. 889,558
[22] Filed Dec. 31, 1969
[45] Patented Nov. 16, 1971
[73] Assignee The United States of America as
 represented by the Administrator of the
 National Aeronautics and Space
 Administration

[54] RESISTANCE SOLDERING APPARATUS
 7 Claims, 2 Drawing Figs.
[52] U.S. Cl.................................................. 219/234,
 29/628, 219/85, 219/158, 228/57
[51] Int. Cl..................................................... B23k 1/12,
 H05b 3/00
[50] Field of Search............................................. 219/234,
 85, 72, 90, 158, 50; 29/628; 228/46, 57

[56] References Cited
 UNITED STATES PATENTS
| 1,200,810 | 10/1916 | Clemens | 219/234 |
| 1,573,925 | 2/1926 | Franke et al. | 219/234 |
| 2,025,917 | 12/1935 | Van Cleef | 219/85 |
| 2,145,651 | 1/1939 | Funk | 219/85 X |
| 2,373,041 | 4/1945 | Martindell | 219/72 X |
| 2,523,291 | 9/1950 | Gilliver | 219/85 |
| 2,926,231 | 2/1960 | McDowell | 219/85 X |

*Primary Examiner*—A. Bartis
*Attorneys*—R. F. Kempf, E. Levy, G. T. McCoy and G. M. Fisher ABSTRACT: An apparatus for resistance soldering a plurality of electric leads to a multiple-terminal block and generally comprises a complementary connector block and a probe. The probe and the complementary connector block are connected to a suitable source of electric power. The complementary connector block is the complement of the multiple-terminal block to which the leads are to be soldered. In other words, if the multiple-terminal block is a male block, the complementary connector block is a corresponding female block and vice versa. All of the terminals of the complementary connector block are commonly connected to one side of said source of electric power and the probe is connected to the other side. Hence, when the tip of the probe is brought into contact with any of the solder cups or connecting tabs of the multiple-terminal block, current flows through that cup and generates sufficient heat for resistance soldering to take place.

PATENTED NOV 16 1971          3,621,194

INVENTOR
CLARA MARIE VERMILLION

BY

ATTORNEYS

RESISTANCE SOLDERING APPARATUS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is related to resistance soldering and more particularly to an apparatus for resistance soldering electric leads to the solder cups or solder tabs, of a multiple terminal block. The multiple-terminal block may be a connector for a circuit board or more generally, a connector for interconnecting any type of electric circuits.

Various types of apparatus for soldering electric leads to solder cups or tabs have been proposed and are in use. One of the most common and least complex apparatus comprises a pair of probe tips pressed against either side of a solder cup of a multiple-terminal block. The probes are connected to a source of electric energy so that a current flows across the cup. When a tinned lead is brought into a solder cup, solder flows between the cup and the lead due to the heat generated by resistance to the current flow.

While the foregoing and similar apparatus have found extensive use, they have certain disadvantages particularly, in space vehicle applications where working space is limited. Specifically, the use of two probes results in a somewhat bulky structure. Further, the requirement to separately bring both probes into positive contact with each solder cup is time consuming. In addition, because the current flow is "across" the cups, the heat flow is not uniform throughout the length of the cups resulting in voids and generally undesirable connections. Moreover, undesirable "wicking" of the solder on the leads outside the cup often occurs.

The prior art has also proposed other apparatus for soldering a plurality of leads to a multiple-terminal block. One such method and apparatus is described in U.S. Pat. No. 2,926,231 issued to R. B. McDowell. That patent describes wrapping an induction heating coil around a heat-transmitting body. A multiple-terminal block is mounted on pins or prongs extending from the heat-transmitting body and leads are projected into solder cups forming a part of the multiple-terminal block. The induced heat causes solder to flow between the leads and the solder cups. While this apparatus is subject to more rapid use than the dual-probe apparatus, it also has certain disadvantages. Specifically, the induced heat heats all of the solder cups as opposed to a single cup, thereby making it difficult to attach a single lead to a single cup. It has the further disadvantage of not uniformly applying heat along the length of the solder cup so that uniform solder flow occurs and requiring the use of more than minimal amounts of power.

Therefore, it is an object of this invention to provide a new and improved apparatus for soldering.

It is a further object of this invention to provide a new and improved apparatus for resistance soldering wherein intermetallic bond along the entire length of the solder area is assured and voids are essentially eliminated.

It is a further object of this invention to provide an apparatus for separately soldering a plurality of leads to the solder cups or connector tabs or points of a multiple-terminal block or interconnector wherein heat is separately applied to each cup essentially uniformly along the length of the cup resulting in a more reliable solder connection being formed.

It is yet another object of this invention to provide a new and improved apparatus for resistance soldering electrical leads to the solder cups or tabs of a multiple-terminal block or interconnector which is faster and more reliable than prior art apparatus.

In accordance with a principle of this invention, an apparatus for resistance soldering a plurality of electrical leads to the solder cups or tabs of a multiple electric terminal block or interconnector is provided. A multiple electric terminal block of the type contemplated by this invention may be a connector terminal block for interconnecting electric circuits or the terminal block of a circuit board. In either event, the apparatus of the invention comprises a complementary connector block connected to the terminals of the multiple-terminal block. The complementary connector block has all of its terminals commonly connected together. This common connection is adapted for connection to one side of a source of electric power. The apparatus also comprises a probe connected to the other side of the source of electrical power. When the probe tip and an electric lead are brought into contact with one of the solder cups of the multiple-terminal block, heat is generated by the inherent resistance to the flow of current. This heat melts solder which is located in either the cup or on a lead which is inserted into the cup for soldering, or both, resulting in a solder joint being formed.

It will be appreciated by those skilled in the art and others that the invention has various advantages over the prior art. Specifically, the invention practically eliminates all voids in the solder joint because heat is generated along the length of the solder cups as opposed to across the cups. In addition, the inventive apparatus for heating the solder cups assures a good intermetallic bond throughout the entire solder region. Moreover, wicking of solder on the lead wires is reduced. It will also be appreciated that because only a single probe is involved, speed and reliability of the solder process is improved over systems utilizing two probes. Moreover, because only a single solder joint is created at a time, the disadvantage of a simultaneous multiple solder joint creating system, which heats areas where heat is not desirable, are eliminated. This is particularly important where only one or a few of the multiple joints is to be soldered—during repair, for example. It will also be appreciated that the use of a single probe as opposed to the use of two probes, aids ease of working in a small working area.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
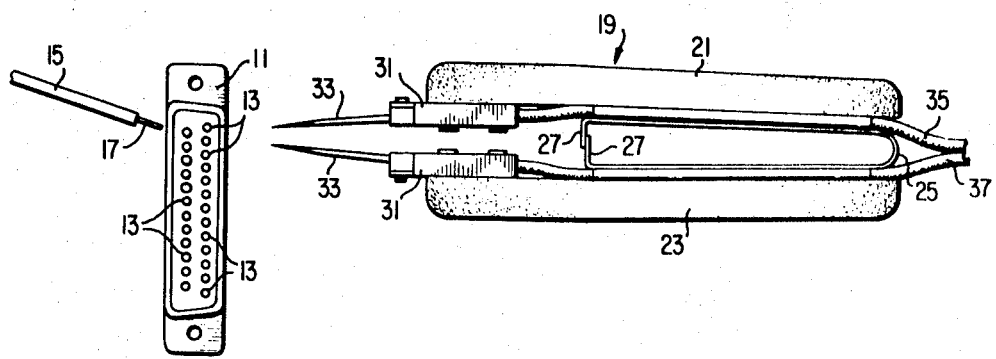
FIG. 1 is a pictorial diagram illustrating a two probe prior art apparatus for resistance soldering.

A prior art resistance soldering apparatus, is illustrated in FIG. 1 and hereinafter described so that the advantages of the herein described preferred embodiment of the invention will be better understood. A multiple-terminal connector structure 11 adapted for connection to a mating multiple terminal connector structure (not shown), and an insulated wire 15 having an exposed end 17 are illustrated in FIG. 1. The multiple-terminal connector structure 11 has a plurality of solder cups 13 on one side. Either the exposed end 17 of the insulated wire 15 or the inner surface of the solder cups 13, or both, are tinned. Hence, when the exposed portion 17 of the insulated wire 15 is placed in a solder cup 13 and heat is applied to the junction between these two elements, solder flows and a solder joint is formed.

The normal most common prior art apparatus for applying heat to this junction is illustrated in FIG. 1 and comprises a resistance soldering structure 19. The resistance soldering structure 19 comprises a pair of generally flat insulated handles 21 and 23. The flat handles are coupled together via a leaf spring 25 which is generally U-shaped. The inner edges of the lead spring each have an inwardly projecting tabs 27. When the handles are brought toward one another the tabs 27 of the leaf spring impinge on their opposite handles so as to limit how close one handle can get to the other handle. Projecting outwardly from the handles are probe elements 31—one probe element for each handle. The probe elements are so mounted that when the handles 21 and 23 are brought toward one another, the tips 33 of the probe elements 31 are also brought toward one another. As previously stated, the tabs 27 control the closeness between the handles which in turn controls the closeness between the tips 33 of the probe elements 31. The probe elements 31 are each connected via cables 35 and 37 to a source of electric power (not shown). The cables 35 and 37 are mounted in the resistance soldering structure 19 between the leaf spring 25 and the handles 21 and 23.

The method of using the structure illustrated in FIG. 1 is to place the exposed end 17 of the wire 15 in the aperture in one of the solder cups 13. Thereafter, the tips 33 of the probe elements 31 are brought into contact with either side of the cup. This action causes an electric current to flow through the cup and the exposed end 17 of the wire. Resistance to this current flow generates heat which causes the solder to melt and flow between the exposed portion 17 of the wire 15 and the related cup 13.

While the foregoing method and structure is satisfactory in some environments, it has certain disadvantages. For example, the use of a two-element probe structure results in an overall structure that is bulky. Further, great accuracy is required to bring both probes into simultaneous contact with a desired solder cup. In addition, heat flow between the probes and the solder cup is not uniform resulting in voids in the solder and voids at the bottom of the cup. Moreover, the poor solder joints cause poor "pull" test results. That is, when the connector structure is tested to see what amount of force can be applied between the leads and the terminal block before separation, the results are poor because of the poor solder joints.

Figure 2:
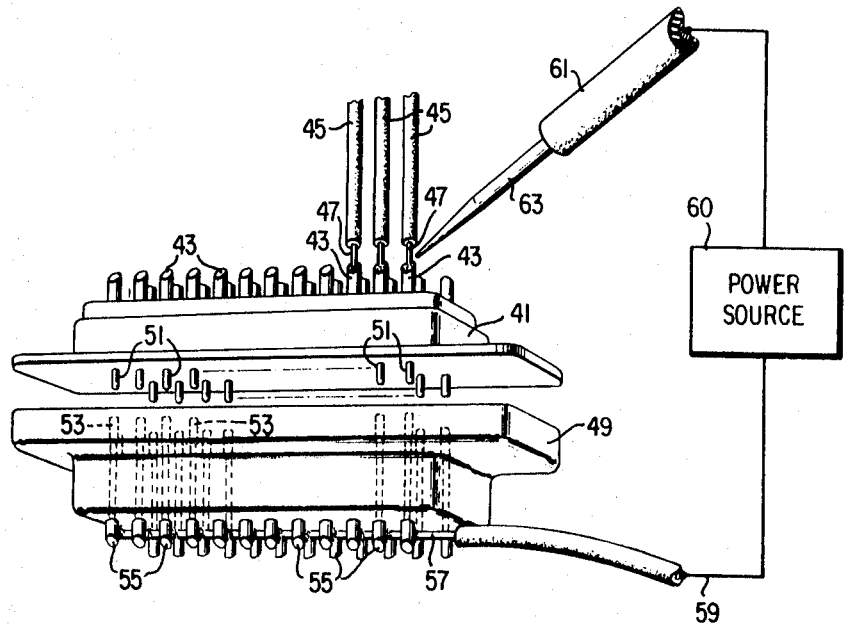
FIG. 2 is a pictorial diagram illustrating apparatus for resistance soldering made in accordance with the invention.

FIG. 2 illustrates a structure formed in accordance with the invention for overcoming the foregoing problems. Specifically, a multiple terminal block or interconnector 41 having a plurality of solder cups 43 is illustrated in FIG. 2. Also illustrated are wires 45 having exposed ends 47. Connected to the multiple-terminal block 41 is a complementary connector block 49 which, while shown as unitary, may be formed of one or two sections. That is, as illustrated in FIG. 2, the multiple terminal block 41 has a plurality of connecting pins 51 that project outwardly. The complementary connector block 49 is complementary in the sense that it has a plurality of apertures 53 designed to receive the pins 51. Alternatively, if the multiple-terminal block had a plurality of apertures, the complementary connector block would have a plurality of pins projecting outwardly. Hence, in order to accommodate both situations, the complementary connector block can be formed of two sections, one section being adapted to fit one situation (such as where the multiple-terminal block has pins, for example) and the other section being an adapter, adapted to change the complementary connector block to fit the other situation (where the multiple-connector block has apertures).

The solder cups 55 of the complementary connector block 49 are commonly connected to a wire bus 57. The wire bus 57 is connected via an electrical lead 59 to one terminal of an electric power source 60 which may be AC or DC, as desired. It will be appreciated by those skilled in the art and others that because of this interconnection, all of the pins (or apertures as the case may be) of the complementary connector block are at the same voltage level. And, because the complementary connector block is connected to the multiple-terminal block, all of the terminals of the multiple-terminal connector 11 are likewise at this same voltage level.

When an exposed end 47 of a wire 45 is inserted into one of the solder cups 43, it is merely necessary to bring the tip 63 of a probe 61, connected to the other terminal of the electric power source 60, into contact with the point of insertion. This causes a current flow longitudinally through the solder cup 43.

The above-described longitudinal current flow results in certain advantages not possessed by the prior art. Specifically, this direction of current flow causes uniform heating along the length of the solder cup resulting in a more reliable connection. That is, an intermetallic bond is assured throughout the entire solder area and voids are eliminated resulting in a more reliable connection being formed. Moreover, the inventive apparatus is easier to use in a limited working area because only a single probe is needed.

It will be appreciated from the foregoing description that the invention is a novel apparatus for resistance soldering. The apparatus generally comprises a complementary connector block for applying power from one side of an electric power source to all of the terminals of a multiple-terminal block or interconnector. The structure further comprises a probe connected to the other side of the electric power source for applying power to the junction between the exposed ends of the wires and the solder cups of the multiple-terminal block. Thus, an uncomplicated, easy to use apparatus is provided by the invention.

It will be appreciated by those skilled in the art and others that while only one type of structure has been illustrated, various structures fall within the scope of the invention. For example the complementary block could be circular or square as opposed to longitudinal, as illustrated. Moreover, the terminal block could be located at the edge of a circuit board structure and have solder tabs not solder cups for interconnection. In this situation, leads would be connected in the manner described to the generally flat terminal tabs of the circuit board structure. Hence, the invention can be practiced otherwise than specifically described herein.

What is claimed is:

1. Apparatus for separately resistance soldering a plurality of electrical leads to a multiple-terminal connector structure having a plurality of connector points for connecting with said plurality of electrical leads and a plurality of connector elements equal in number to said plurality of connector points and formed integral therewith, said apparatus comprising a complementary connector structure having connector elements, that both complement and electrically and mechanically connect with respective connector elements of said multiple-terminal connector structure, and connector points, equal in number to said connector elements of said complementary connector structure and formed integral therewith, all of said connector points of said complementary connector structure being commonly connected together and to one side of a source of electric power and a probe connected to the other side of said source of electric power, the size of said probe being appropriate for contact with a single electrical lead of said plurality of electrical leads and a single connector point of said plurality of connector points of said multiple terminal connector structure when said lead is brought in contact with said connector point.

2. Apparatus as claimed in claim 1 wherein said probe has a single tip.

3. Apparatus as claimed in claim 1 wherein said connector points of said multiple terminal connector structure are of the solder cup type.

4. Apparatus as in claim 1 wherein said connector elements of said multiple terminal structure are of the male type and said connector elements of said complementary connector structure are of the female type.

5. Apparatus as in claim 1 wherein said connector points of said complementary connector structure are formed in two substantially parallel rows and said one side of said source of electric power in connected via a bus bar to said connector points of said complementary connector structure from connector point to connector point up one row and down the second.

6. Apparatus in claim 5 wherein said connector points of said multiple terminal connector structure are of the solder cup type.

7. Apparatus as claimed in claim 6 wherein said probe has a single tip.

* * * * *